US010257674B2

(12) United States Patent
Cooke et al.

(10) Patent No.: US 10,257,674 B2
(45) Date of Patent: Apr. 9, 2019

(54) SYSTEM AND METHOD FOR TRIGGERING ON PLATFORM USAGE

(71) Applicant: Twilio, Inc., San Francisco, CA (US)

(72) Inventors: Evan Cooke, San Francisco, CA (US); Timothy Milliron, San Francisco, CA (US); Adam Ballai, San Francisco, CA (US); Matthew D. Nowack, San Francisco, CA (US); Robert C. Hagemann, III, San Francisco, CA (US)

(73) Assignee: Twilio, Inc., San Francisco, CA (US)

( * ) Notice: Subject to any disclaimer, the term of this patent is extended or adjusted under 35 U.S.C. 154(b) by 0 days.

(21) Appl. No.: 16/014,980

(22) Filed: Jun. 21, 2018

(65) Prior Publication Data

US 2018/0302309 A1    Oct. 18, 2018

Related U.S. Application Data

(63) Continuation of application No. 15/065,660, filed on Mar. 9, 2016, now Pat. No. 10,033,617, which is a
(Continued)

(51) Int. Cl.
*H04M 15/00*    (2006.01)
*H04W 4/16*    (2009.01)
(Continued)

(52) U.S. Cl.
CPC .............. *H04W 4/16* (2013.01); *G06F 9/542* (2013.01); *G06F 9/546* (2013.01); *H04L 43/08* (2013.01);
(Continued)

(58) Field of Classification Search
CPC ............. G06F 11/3003; G06F 11/3006; G06F 11/301; G06F 11/3065; G06F 11/3089;
(Continued)

(56) References Cited

U.S. PATENT DOCUMENTS 5,274,700 A    12/1993   Gechter et al.
5,526,416 A     6/1996   Dezonno et al.
(Continued)

FOREIGN PATENT DOCUMENTS

DE    1684587 A1    3/1971
EP    0282126 A2    9/1988
(Continued)

OTHER PUBLICATIONS

"Aepona's API Monetization Platform Wins Best of 4G Awards for Mobile Cloud Enabler", 4G World 2012 Conference & Expo. [Online]. [Accessed Nov. 5, 2015]. Retrieved from the Internet: <URL: https://www.realwire.com/releases/%20Aeponas-API-Monetization>,(Oct. 30, 2012), 4 pgs.
(Continued)

*Primary Examiner* — Binh Kien Tieu
(74) *Attorney, Agent, or Firm* — Schwegman Lundberg & Woessner, P.A.

(57) ABSTRACT

A system and method for triggering on platform usage can include at a platform, receiving and storing a trigger configuration of an account; operating a platform comprising internally executing a process on behalf of an account and publishing at least one event when executing the process; at the platform, incrementing a counter in response to the at least one event and if the stored trigger configuration species a usage key associated with a category of counted events of the at least one event; monitoring counters in a context of an associated trigger; and processing the trigger upon the counter satisfying condition of an associated trigger.

17 Claims, 10 Drawing Sheets

Related U.S. Application Data continuation of application No. 14/569,036, filed on Dec. 12, 2014, now Pat. No. 9,319,857, which is a continuation of application No. 14/054,464, filed on Oct. 15, 2013, now Pat. No. 8,938,053.

(60) Provisional application No. 61/714,113, filed on Oct. 15, 2012, provisional application No. 61/879,035, filed on Sep. 17, 2013.

(51) Int. Cl.
  *H04W 24/08* (2009.01)
  *G06F 9/54* (2006.01)
  *H04L 12/26* (2006.01)
  *H04L 29/08* (2006.01)

(52) U.S. Cl.
  CPC ............. *H04L 43/10* (2013.01); *H04L 67/02* (2013.01); *H04W 24/08* (2013.01); *H04Q 2213/13098* (2013.01)

(58) Field of Classification Search
  CPC .. G06F 11/34; G06F 11/3476; G06F 11/3495; G06F 21/55; G06Q 11/00; H04L 43/08; H04L 43/0805; H04L 43/0876; H04L 43/16; H04L 63/1408; H04L 63/1416; H04L 63/1425
  USPC ...... 379/32.01, 111, 112.01, 112.04, 112.06, 379/114.01, 131, 133, 201.01, 201.02; 709/203, 224, 229; 719/328; 726/23
  See application file for complete search history.

(56) References Cited

U.S. PATENT DOCUMENTS

| | | | |
|---|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Strom et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,058,181 B2 | 6/2006 | Wright et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,099,442 B2 | 8/2006 | Da Palma et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| D540,074 S | 4/2007 | Peters |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |

(56) References Cited

U.S. PATENT DOCUMENTS

| | | |
|---|---|---|
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,760,861 B1 * | 7/2010 | Croak .............. H04W 4/24 379/114.14 |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soderstrom et al. |
| 8,103,725 B2 | 1/2012 | Gupta et al. |
| 8,126,128 B1 | 2/2012 | Hicks, III et al. |
| 8,126,129 B1 | 2/2012 | Mcguire |
| 8,130,750 B2 | 3/2012 | Hester |
| 8,130,917 B2 | 3/2012 | Helbling et al. |
| 8,139,730 B2 | 3/2012 | Da Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | Mckeown |
| 8,355,394 B2 | 1/2013 | Taylor et al. |
| 8,411,669 B2 | 4/2013 | Chen et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |
| 8,601,136 B1 | 12/2013 | Fahlgren et al. |
| 8,611,338 B2 | 12/2013 | Lawson et al. |

(56) References Cited

U.S. PATENT DOCUMENTS

| | | |
|---|---|---|
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Toba et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,855,271 B2 | 10/2014 | Brock et al. |
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,071,677 B2 | 6/2015 | Aggarwal et al. |
| 9,137,127 B2 | 9/2015 | Nowack et al. |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 9,900,269 B2 | 2/2018 | Hong et al. |
| 10,033,617 B2 | 7/2018 | Cooke et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matena et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008065 A1 | 1/2006 | Longman et al. |

(56) References Cited

U.S. PATENT DOCUMENTS

| | | |
|---|---|---|
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0094674 A1 | 4/2009 | Schwartz et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |

(56) References Cited

U.S. PATENT DOCUMENTS

| | | |
|---|---|---|
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0045807 A1 | 2/2011 | Issa et al. |
| 2011/0045808 A1 | 2/2011 | Issa et al. |
| 2011/0045810 A1 | 2/2011 | Issa et al. |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179646 A1 | 7/2012 | Hinton et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0290880 A1 | 11/2012 | Bardack et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0097304 A1 | 4/2013 | Asthana et al. |
| 2013/0110658 A1 | 5/2013 | Lyman et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0254824 A1* | 9/2013 | Eyer .................. H04N 21/2353 725/116 |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |

(56) References Cited

U.S. PATENT DOCUMENTS

| | | |
|---|---|---|
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0100689 A1 | 4/2015 | Cooke et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2016/0011758 A1 | 1/2016 | Dornbush et al. |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0125184 A1 | 5/2016 | Mahaffey et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0191366 A1 | 6/2016 | Cooke et al. |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis et al. |
| 2016/0239770 A1 | 8/2016 | Batabyal et al. |
| 2017/0339283 A1 | 11/2017 | Chaudhary et al. |

FOREIGN PATENT DOCUMENTS

| | | |
|---|---|---|
| EP | 1464418 A1 | 10/2004 |
| EP | 1522922 A2 | 4/2005 |
| EP | 1770586 A1 | 4/2007 |
| EP | 2053869 A1 | 4/2009 |
| ES | 2134107 A1 | 9/1999 |
| JP | 10294788 A | 11/1998 |
| JP | 2004166000 A | 6/2004 |
| JP | 2004220118 A | 8/2004 |
| JP | 2006319914 A | 11/2006 |
| WO | WO-9732448 A1 | 9/1997 |
| WO | WO-2002087804 A1 | 11/2002 |
| WO | WO-2006037492 A1 | 4/2006 |
| WO | WO-2009018489 A2 | 2/2009 |
| WO | WO-2009124223 A1 | 10/2009 |
| WO | WO-2010037064 A1 | 4/2010 |
| WO | WO-2010040010 A1 | 4/2010 |
| WO | WO-2010101935 A1 | 9/2010 |
| WO | WO-2011091085 A1 | 7/2011 |

OTHER PUBLICATIONS

"U.S. Appl. No. 14/054,464, Examiner Interview Summary dated Jul. 2, 2014", 3 pgs.

"U.S. Appl. No. 14/054,464, Non Final Office Action dated Feb. 28, 2014", 13 pgs.

"U.S. Appl. No. 14/054,464, Notice of Allowance dated Sep. 10, 2014", 11 pgs.

"U.S. Appl. No. 14/054,464, Notice of Allowance dated Oct. 24, 2014", 2 pgs.

"U.S. Appl. No. 14/054,464, Response filed Jun. 30, 2014 to Non Final Office Action dated Feb. 28, 2014", 12 pgs.

"U.S. Appl. No. 14/569,036, Non Final Office Action dated Jun. 5, 2015", 6 pgs.

"U.S. Appl. No. 14/569,036, Notice of Allowance dated Jan. 8, 2016", 2 pgs.

"U.S. Appl. No. 14/569,036, Notice of Allowance dated Dec. 11, 2015", 9 pgs.

"U.S. Appl. No. 14/569,036, Response filed Oct. 5, 2015 to Non Final Office Action dated Jun. 5, 2015", 6 pgs.

"U.S. Appl. No. 15/065,660, Notice of Allowance dated Apr. 10, 2018", 11 pgs.

"Archive Microsoft Office 365 Email I Retain Unified Archiving", GWAVA, Inc., Montreal, Canada, [Online] Retrieved from the internet: <http://www.gwava.com/Retain/Retain_for_Office_365.php>, (2015), 4 pgs.

"Complaint for Patent Infringement", *Telinit Technologies, LLC* v. *Twilio Inc* 2:12-cv-663, (Oct. 12, 2012), 17 pgs.

"Ethernet to Token ring Bridge", Black Box Corporation, [Online] Retrieved from the internet: <http://blackboxcanada.com/resource/files/productdetails/1704.pdf>, (Oct. 1999), 2 pgs.

"Twilio Cloud Communications—APIs for Voice, VoIP, and Text Messaging", Twilio, [Online] Retrieved from the internet: <http://www.twilio.com/docs/api/rest/call-feedback>, (Jun. 24, 2015), 8 pgs.

Abu-Lebdeh, et al., "A 3GPP Evolved Packet Core-Based Architecture for QoS-Enabled Mobile Video Surveillance Applications", 2012 Third International Conference on the Network of the Future {NOF), (Nov. 21-23, 2012), 1-6.

Barakovic, Sabina, et al., "Survey and Challenges of QoE Management Issues in Wireless Networks", Hindawi Publishing Corporation, (2012), 1-29.

Berners-Lee, T., "RFC 3986: Uniform Resource Identifier (URI): Generic Syntax", The Internet Society, [Online]. Retrieved from the Internet: <URL: http://tools.ieft.org/html/rfc3986>, (Jan. 2005), 57 pgs.

Kim, Hwa-Jong, et al., "In-Service Feedback QoE Framework", 2010 Third International Conference on Communication Theory. Reliability and Quality of Service, (2010), 135-138.

Matos, et al., "Quality of Experience-based Routing in Multi-Service Wireless Mesh Networks", Realizing Advanced Video Optimized Wireless Networks. IEEE, (2012), 7060-7065.

Mu, Mu, et al., "Quality Evaluation in Peer-to-Peer IPTV Services", Data Traffic and Monitoring Analysis, LNCS 7754, 302-319, (2013), 18 pgs.

Subramanya, et al., "Digital Signatures", IEEE Potentials, (Mar./Apr. 2006), 5-8.

Tran, et al., "User to User adaptive routing based on QoE", ICNS 2011: The Seventh International Conference on Networking and Services, (2011), 170-177.

\* cited by examiner

| Category | Description |
|---|---|
| calls | All voice calls, inbound & outbound. Count is the number of calls and Usage is the number of minutes. |
| calls-inbound | All inbound voice calls, to both toll-free and local numbers. |
| calls-inbound-local | All inbound voice calls to local numbers. |
| calls-inbound-tollfree | All inbound voice calls to toll-free numbers. |
| calls-outbound | All outbound voice calls. |
| calls-client | All TwilioClient voice calls. |
| sms | All SMS messages, both inbound and outbound. Count and Usage are both the number of messages sent. |
| sms-inbound | All inbound SMS messages, to both short-codes and long-codes. |
| sms-inbound-shortcode | All inbound SMS messages to short-codes. |
| sms-inbound-longcode | All inbound SMS messages to long-codes. |
| sms-outbound | All outbound SMS messages, from both short-codes and long-codes. |
| sms-outbound-shortcode | All outbound SMS messages from short-codes. |
| sms-outbound-longcode | All outbound SMS messages from long-codes. |
| phonenumbers | All phone numbers owned by the account, toll-free and local. |
| phonenumbers-tollfree | All toll-free phone numbers owned by the account. |
| phonenumbers-local | All local phone numbers owned by the account. |
| shortcodes | All short-codes owned by the account, of all types. |
| shortcodes-vanity | All vanity short-codes owned by the account. |
| shortcodes-random | All randomly-assigned short-codes owned by the account. |
| shortcodes-customerowned | All short-codes owned by the account that are leased from another provider. |
| calleridlookups | CallerID (CallerName) lookups. |
| recordings | Recordings of voice calls. Count is the number of recordings and Usage is the number of recorded minutes. Note that Twilio doesn't charge for making recordings (only storing them long term) so Price will always be 0. |
| transcriptions | Transcriptions of voice calls. Count is the number of transcriptions and Usage is the number of transcribed minutes. |
| recordingstorage | Amount of storage used by call recordings stored for the account. Count is the number of stored recordings, Usage is the number of stored recorded minutes, and Price is the price of storing the recordings. |
| totalprice | Total price of all usage. Usage will be the same as Price, and Count will be empty. Note that some Twilio costs may not be included in any usage category, so the sum off all usages may or may not be equal to the Price of TotalPrice. |

FIGURE 3

SYSTEM AND METHOD FOR TRIGGERING ON PLATFORM USAGE

CROSS-REFERENCE TO RELATED APPLICATIONS

This application is a continuation of U.S. patent application Ser. No. 15/065,660, filed 9 Mar. 2016, which is a continuation of U.S. patent Application Ser. No. 14/569,036, filed 12 Dec. 2014, which is a continuation of U.S. patent application Ser. No. 14/054,464, filed 15 Oct. 2013, now issued as U.S. Pat. No. 8,938,053, which claims the benefit of U.S. Provisional Application Ser. No. 61/714,113 filed on 15 Oct. 2012 and U.S. Provisional Application Ser. No. 61/879,035 filed on 17 Sep. 2013, all of which are incorporated in their entirety by this reference.

TECHNICAL FIELD

This invention relates generally to the application platform field, and more specifically to a new and useful system and method for triggering on platform usage in the application platform field.

BACKGROUND

In application platforms, developers using the platform often want to be able to detect when particular events occur. To do so, many developers develop polling systems to detect when an event occurs. Building such a system can be time consuming and difficult to maintain. Furthermore, some events of the application platform may not be exposed through an API or other programmatic interface. The application platform may have logistical reasons, security reasons, or business reasons for not exposing all internal events to third party developers. Thus, for some events, developers may not be able to detect the event. Thus, there is a need in the application platform field to create a new and useful system and method for triggering on platform usage. This invention provides such a new and useful system and method.

BRIEF DESCRIPTION OF THE FIGURES

FIG. 3 is a table of exemplary usage counters of a preferred embodiment;

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Triggering on Platform Usage

Figure 1:
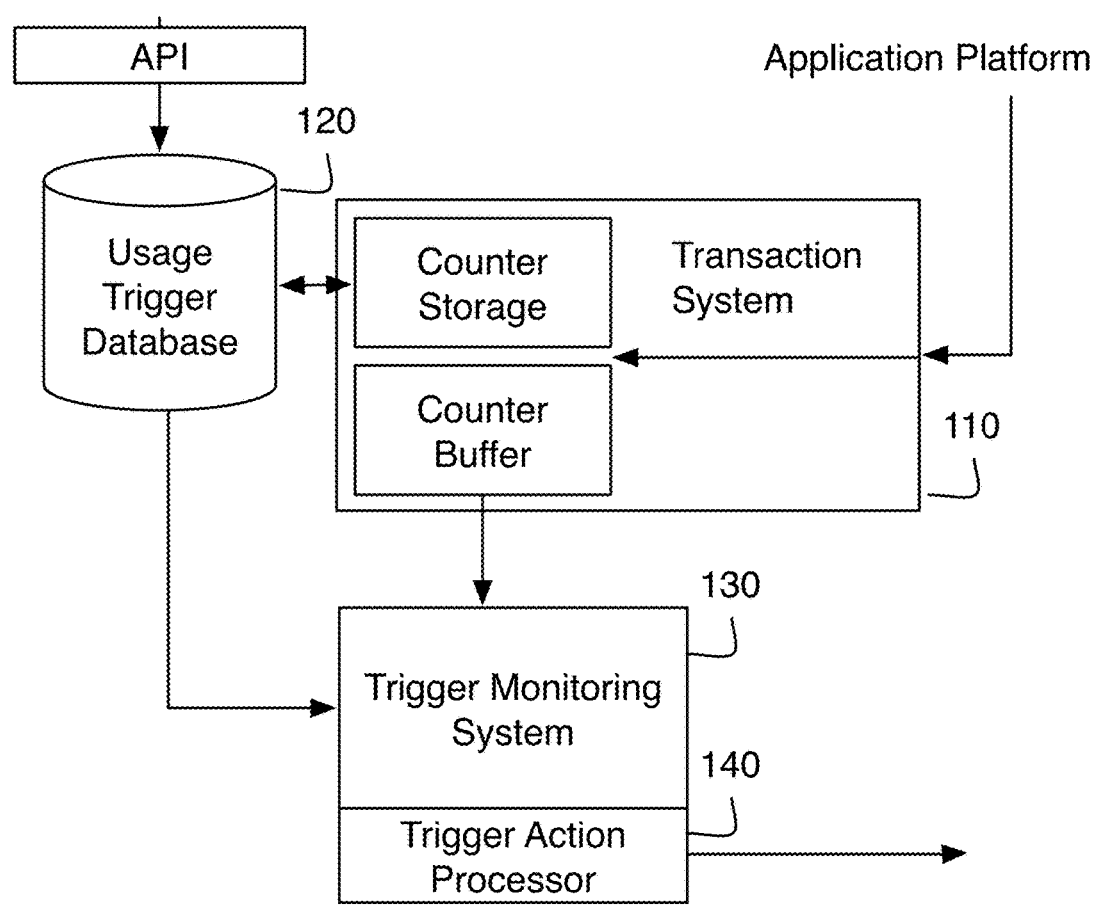
FIG. 1 is a schematic representation of a system of a preferred embodiment of the invention.

As shown in FIG. 1, a system for triggering on platform usage of a preferred embodiment can include a transaction system 110, usage trigger database 120, a trigger monitoring system 130, and a trigger action processor 140. The system functions to create a simple interface for outside applications to deploy usage based events within a closed platform. An interface to the system preferably enables a user/developer to generate a new usage trigger for an application or service platform. During operation of the application platform the system can update and monitor the status of various event counters. When a particular counter satisfies a usage trigger, actions corresponding to the usage trigger can be performed. The system can preferably achieve improved efficiency and provide a wider range of trigger options, compared to an event polling system from an outside developer, when the usage triggers are integrated into the operation of the application platform. Furthermore, the system can accommodate the application server of an account holder being separate from the application platform by at least one security layer. The system can be used for general usage and event tracking of internal processing of the application platform, but the system can similarly be used for asynchronous error and warning handling.

The system is preferably implemented alongside an application platform. Preferably, the application platform is a multitenant, distributed computing system providing an HTTP-based application programming interface (API). The application platform may alternatively be any suitable platform. The application platform preferably provides a service used by outside applications or devices. In one preferred variation, the application platform preferably provides a usage-based API service. In one variation, the usage-based API service enables use of communication channels such as the telephony application platform described in U.S. patent application Ser. No. 12/417,630 filed 2 Apr. 2009, entitled "System and Method for Processing Telephony Sessions", which is hereby incorporated in its entirety by this reference. A telephony or communication application platform can enable synchronous communication sessions such as voice sessions, video sessions, screen sharing sessions, or any suitable synchronous form of media communication. The communication can be carried out over PSTN channels, SIP channels, IP-based channels, WebRTC, or any suitable communication protocol. The communication application platform can similarly facilitate asynchronous communication such as SMS, MMS, IP-based client application messaging, proprietary platform messaging (e.g., social network messaging), or any suitable form of asynchronous communication. The application platform may alternatively provide any suitable service. The system is preferably integrated within an application platform. Alternatively, the system may serve as a standalone service and may include an interface to enable at least one application platform or applications to generate events, toggle counters, generate usage triggers, perform responses for a usage trigger, and/or interact with the system in any suitable manner.

The application platform is preferably a multitenant platform with multiple accounts using the platform to supplement operation of external applications. The application platform is a different system from the external applications, and mode of interaction and the security between the application platform and the application of an account can characterize that separation. For example, operations and resource of the application platform can be inaccessible by an outside entity (e.g., an account holder). Internal computing resources (e.g., servers, databases, routers, etc.) can be protected through various means such as IP white listing, IP black listing, firewalls, or other forms of isolating access to a restricted set of resources approved by the application platform.

As with the telephony application platform described above, the application platform can include characteristics of operating according to responses of an outside developer application. In some instances, the application platform submits requests to the client application, and the application platform will perform a service according to the response. Such a model can be common in communication-based service platforms where the service platform provides significant infrastructure to handle incoming calls. The application platform acts as infrastructure delegate for a particular service. In some instances, the application platform will post data to the application server (e.g., an HTTP POST). In the telephony application platform, the platform detects external events such as an incoming telephone calls. In response to a call associated with an account, the application platform requests processing directions/instruction from an application server of the account. The application server can be hosted and operated by an outside party independent of the telephony platform. From the perspective of the application server, the telephony application platform is a type of client device (e.g., a browser session). However, unlike a user controlled client device, customized client-side code may not be created and installed on a client side browser in the same manner. Such client-side custom browser code could be used by a developer to catch and responsively relay suitable data to the application server, but that option may not exist in such an application platform. Within the telephony application platform, application instructions are executed and managed according to the platform infrastructure and logic. In the case of a telephony application platform, considerable infrastructure and services are required to provide the calling services. Logistically, the complexity of the system can be a barrier to allow customer customization (i.e., customization by outside application developers). Unlike a system where an application server communicates with a developer-implemented client application, the developer cannot modify the platform components beyond the interfaces exposed by the application platform. Additionally or alternatively, even when customization would be feasible privacy issues, business strategy, and security issues can pose other barriers that the system functions to support.

At least one security layer can additionally exist between the application platform and an external application. The application platform can depend on application API requests to include account authentication information. An outside application server can include security to protect access by entities external to the application server. In particular, the resources referenced by a callback URI can be secured through an authentication layer, a certificate verification layer, an IP whitelist/blacklist, a virtual private network (VPN) tunnel, or any suitable form of security.

A transaction system 110 of a preferred embodiment functions to increment counters of application platform events. The transaction system 110 is preferably coupled to an application platform. The transaction system 110 is preferably integrated into the operation of the application platform. A variety of different services and resources of an application platform can be configured to notify the transaction system 110 of events, usage updates, errors, warnings, or any suitable usage event of the application platform. The transaction system 110 can log individual platform events. In some variations, a sub-set of the stored platform events can be queried and accessed through a platform API or user interface. Another sub-set of stored platform events could be internal and include private event information. The internal platform events can contain private information. The internal platform events can be used in combination to initiate a usage trigger. In the case of the telephony application platform, call routers, SMS servers, MMS servers, video servers, client servers, SIP servers, and other suitable components can send event information.

Figure 2:
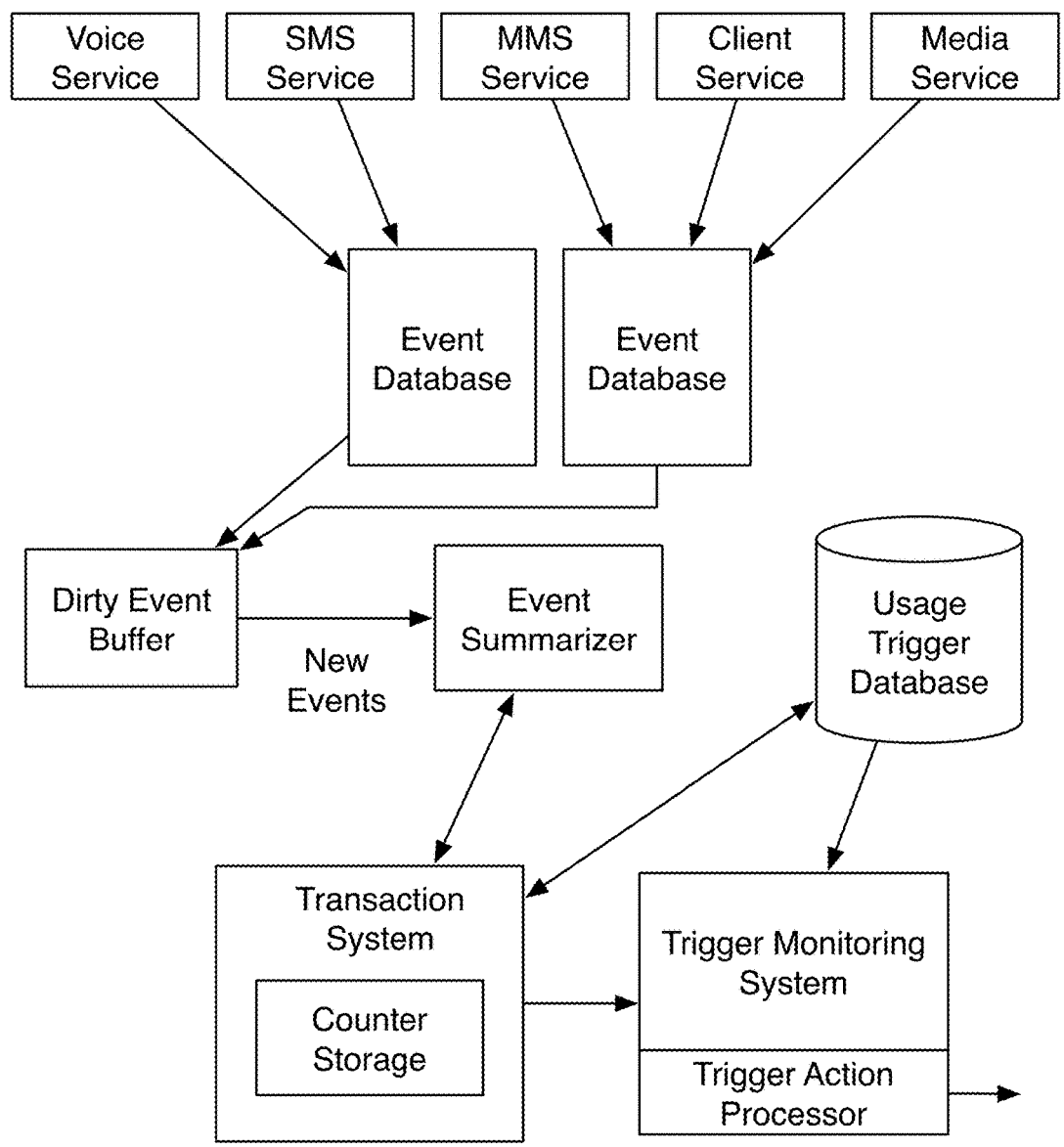
FIG. 2 is a schematic representation of an alternative system of a preferred embodiment of the invention.

The transaction system 110 can have several various configurations. In one variation, events are broadcasted and selectively counted if a trigger exists that is dependent on a counter of that event type as shown in FIG. 1. The transaction system no preferably includes counter storage and a counter buffer. The counter storage and buffer preferably store the count of particular types of events and facilitate triggering when a counter reaches usage trigger threshold. In another variation, the events are individually stored in a log, and the individual events can then be processed and added to a counter storage system as shown in FIG. 2. In some situations, the transaction system 110 can include a summarizer which functions to process individual event logs and appropriately store a new counter or update an existing counter in the counter storage.

A counter storage module can function as a log of transaction history of an application platform. The counter storage preferably stores a plurality of counters. The counter storage is preferably a database but may be any suitable system for storing counter data. The counters may be tied to a particular account, subaccounts, and/or any suitable entity. The counters preferably include a parameter indicating the number of occurrences or instances for a particular application platform event of the application platform. The counter storage module preferably includes a sparse set of counters. The set of counters does not have to be the full set of all countable events. The spares set of counters can maintain counters for types of events on which triggers depend. Internal logic of the counter storage module can check with the usage trigger database 120 (using the event parameters to query for usage triggers of interest) to determine if an event should be added to a counter. A counter can alternatively be created through an API or a user interface. In one implementation, a REST API is used to create a usage trigger by posting trigger customization parameters to a platform URI resource of "/usage/trigger/" with daily counter parameter of 365 and hourly counter parameter of 24, and event pattern of a block of particular area codes. In some cases, maintaining a counter is associated with some expense either for the application platform and/or the associated account. Accordingly, the system enables flexibility of creating counters without automatically counting every type of event for all accounts. In some cases, the system can include default counters that are created for particular types of events. Triggers stored in the usage trigger database 120 can preferably be attached or associated with a particular counter. As shown in FIG. 3, some exemplary counters may include calls, inbound or outbound calls to a particular type of destination (local, toll free, specified country codes etc.), SMS/MMS messages, inbound or outbound SMS/MMS messages to a particular type of destination, phone number or endpoint allocation, subaccount creation, resource creation, recordings or media creation, storage space, price for all usage, billing information events, event locations, API calls, system errors and warnings, or any suitable form of usage counter. For example, a counter may be maintained for the number of calls made by a particular account on a telephony platform. A counter may alternatively or additionally include a parameter indicating any suitable metric of an event or entity, such as timing of events, frequency of events, properties of events, or any suitable metric.

A counter buffer can function as a temporary collection of counters that that are awaiting analysis by the trigger monitoring system 130. The counter buffer can temporarily store newly incremented counters in the buffer. After the trigger monitoring system 130 has processed a counter in the counter buffer, the counter can be deleted or removed from the buffer in a suitable manner.

In one variation of the system, the system can include an event buffer, which functions as a dirty cache of new event information. The dirty cache is preferably used in combination with an individual event log and optionally a summarizer. Rather than selectively add events to a counter, the system can delay counting events until a defined time. The event buffer is a record of events yet to be counted. To avoid constantly updating counters, the event bugger can store a pointer to stored events that await processing into a counter storage module. When a counter should be updated according to timing of a usage trigger, the summarizer or other suitable component processes unaccounted events into the counter. The system can use other alternative approaches to updating a counter such as recording a timestamp of last update and retrieving events after that timestamp when updating the counter or using any suitable approach to consuming events into a counter.

The summarizer can function as a service to process individual event logs into counters. In some instances, a counter may be created for a class of events. Events sharing common properties can be counted together. In a notification counting implementation, the events can include a URI source of the processed instructions, the notification code (which identifies a category of an error, warning, or acknowledgment), and a notification level (which can indicate if the notification is an alert, a warning, an error, or a fatal error). The summarizer can group events according to these event parameters. For example, an event can be logged for every communication session established on behalf of the account. Those sessions can be directed at different destination endpoints or addresses. All of these events can be counted as a whole to measure total number of calls, but the summarizer can alternatively count one subset or multiple subsets of the events. Some events can additionally contribute to the count of multiple counters. For example, communication events directed at telephone numbers with a particular area code can be counted in a counter for that area code and with a total outbound call counter. The summarizer pattern matching can be rule based, use regular expressions, or use any suitable approach to detect patterns. The summarizer can additionally do fuzzy detection of groups to automatically detect events that match patterns of a group of events. In the case of error events, multiple events may be logged with the same error code; the summarizer can process an error report stored with the error events to further distinguish between the error events. For example, an error code could be caused by an internal error of the platform or by malformed instructions from an application server. The summarizer could process the error report and distinguish between these two types of errors based on natural language processing of the code or data leading up to the error.

A usage trigger database 120 of a preferred embodiment functions to store resources characterizing how to monitor usage and actions to perform. The usage trigger database 120 preferably stores a plurality of usage triggers. A usage trigger is preferably a data object characterizing when to trigger and at least one response action. The usage trigger is preferably set for a particular type of counter. Additionally, a trigger evaluation interval may be set such that the usage trigger will only constitute a trigger on a periodic basis (e.g., hourly, daily, monthly, one time, etc), for a particular event, and/or according to any suitable rule. Polling is one variation for implementing the trigger evaluation intervals. The usage trigger preferably additionally includes at least one parameter defining a response when the trigger is satisfied. One parameter could be a callback URI, where an HTTP response can be sent. The callback URI preferably references a web application controlled by the developer creating the usage trigger, and the web application may perform any suitable action the developer configures. The trigger monitoring system 130 will preferably use the stored callback URI as a destination endpoint for a transmitted message with the counter status. Additionally or alternatively, the usage trigger may specify a particular application platform response. For example, in a telephony application platform, a call can be ended even if the call is in progress. Enabling counter based manipulation of an application can allow applications to respond to events that could otherwise not be possible by outside developers. Private data and platform functions can be performed on behalf of the developer in response to internal counters. Similarly, the platform response could include modifying an account, a communication session, application instance, or any suitable response. The usage triggers are preferably set for particular accounts or other groupings. The usage triggers in the usage trigger database 120 can be keyed by application platform accounts or subaccounts or any suitable key. The usage triggers may alternatively be globally set.

A trigger monitoring system 130 functions to monitor the counters in the context of the set usage triggers. The trigger monitoring system 130 is preferably communicatively coupled to the counter buffer of the transaction system 110. The trigger monitoring system 130 preferably reads recently updated counters from the counter buffer, compares counters to an associated usage trigger if one exists, initiates a response by the trigger action processor 140 if required, and removes the counter from the counter buffer. The trigger monitoring system 130 may alternatively retrieve counters from the transaction system 110 in any suitable manner. If a particular counter does not have an associated usage trigger or the usage trigger evaluation interval doesn't call for processing, then the counter is simply removed from the buffer and no response is triggered.

A trigger action processor 140 of a preferred embodiment functions to initialize or perform the response of an activated usage trigger. The trigger action processor 140 is preferably a subprocess of the trigger monitoring system 130, but may alternatively be an independent module, at least a sub-portion of an integrated application platform, or any suitable component. As described above, the response of a usage trigger can include a callback URI. The trigger action processor 140 will preferably make an HTTP request to the callback URI when a usage trigger is processed. The HTTP request may include parameters associated with the usage trigger and/or the counter. Additionally or alternatively, the trigger action processor 140 may use a component to access an API of an application platform to perform a designated action specified in the usage trigger.

2. Method of Triggering on Platform Usage

Figure 4:
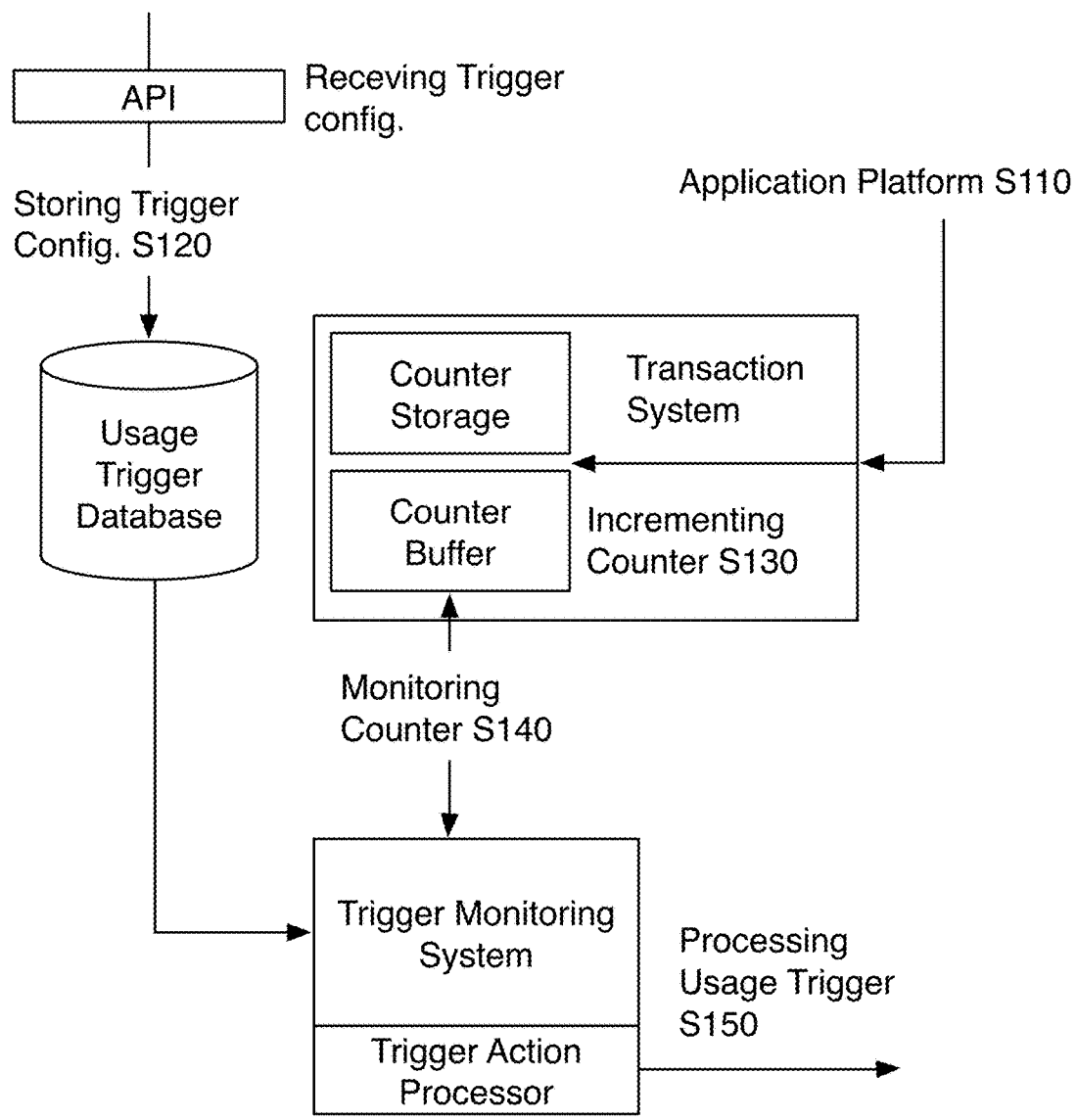
FIG. 4 is a schematic representation of a method of a preferred embodiment of the invention.

As shown in FIG. 4, a method for triggering on platform usage of a preferred embodiment can include operating a platform S110; receiving a trigger configuration and storing the trigger configuration in a usage trigger database S120; a transaction system incrementing a counter S130; monitoring counters in context of an associated usage trigger S140; and processing usage trigger upon a counter satisfying condition of the usage trigger S150. The method functions to enable implementation of usage triggers for an application platform. The method is preferably implemented by a system substantially similar to the one described above but may alternatively be implemented in any suitable manner. The method is preferably implemented at a system integrated with an application platform, but the method may alternatively be used in operation of a system providing a usage trigger service to outside applications and/or platforms. The method preferably enables usage triggers to be set by outside developers or users of an application platform.

Step S110, which includes operating the platform, functions to execute processes of the platform to generate events. As the method can enable multitenant usage triggers controlled by outside entities, the triggers enabled by the method may provide insight into events otherwise not viewable from outside entities through an API (e.g., for reasons relating to business issues, technical limitations, security concerns, and/or other reasons). The method can be particularly beneficial to application platforms that operate according to responses of an outside developer application. While the application platform can be actively prompted to perform an action, the application platform preferably includes an operation model where the platform independently processes data/information/events and communicates requests to outside applications for direction. An outside developer can configure an external application server to direct the application platform through instructions. Such a delegate operational platform model can be useful in infrastructure specialized platforms and/or platforms managing secure or private information, Telephony and/or communication service platforms are one example of an application platform that would have specialized infrastructures—there would be numerous business and security reasons why the system architecture and the raw event information could not be exposed to enable outsiders to build such a counter event system. Similarly, many application platforms would have access to a large amount of event information which could be pooled from within an account or across multiple accounts in a multitenant environment. Again, there would be numerous privacy, security, competitive advantage, and logistical reasons that could prevent directly exposing information enabling a counter event system, but the method of the preferred embodiment can accommodate such concerns. One characteristic of a delegate operational platform is that the platform can operate asynchronous to the execution of the outside application that uses the platform. In one embodiment, the method can function as an asynchronous try-catch feature of a platform for outside developers. In another embodiment, the method can function to integrate application business logic of an outside application with unexposed operations of an application platform.

Operating the platform preferably executes a process on behalf of an account and during execution of the process events can be published. The events can be notifications from various services of the platform, errors, warnings, status updates or any suitable event log. Various services and resources of the platform publish the events. The method can work in cooperation with an existing event logging system or alternatively platform resources can directly publish events to the transaction system. Executing the process is preferably performed on resources inaccessible by an account holder (i.e., an account holder has limited visibility into events occurring). Executing a process can include processing a request made by an outside resource. Executing a process can alternatively include processing application instructions at least partially supplied by an account holder. In a communication service platform, executing the process can include facilitating/hosting/managing a synchronous communication session (e.g., voice, video, screen sharing or other suitable communication session). Application instructions can additionally be executed during that communication session. Executing the process can additionally or alternatively include a communication service platform sending/receiving messages (e.g., SMS messages, MMS messages).

Step S110, which includes receiving a trigger configuration, functions to configure settings that control trigger events within a system. The trigger configuration is preferably received as a request through an application programming interface (API). The API may be used to enable applications to programmatically create, read, update, and/or delete trigger configurations. The trigger configuration may alternatively be specified and transmitted through a user interface. For example, a user may be able to input usage trigger settings from an account management website. Usage trigger configuration preferably specifies at least one usage key to which the usage trigger relates. The usage key specifies the event, resource, notification, error, or item counted and used to trigger a response. Exemplary usage keys can include total sales, call time, counts of events like sent or received messages, counts of particular API calls, measure of a particular resource usage, or any suitable usage type. The usage keys can be an identifier for pre-configured event categories such as 'calls', calls-inbound', or 'calls-inbound-mobile'. The usage keys can alternatively be a dynamically generated identifier for dynamically defined event categorization (i.e., customized event categorization). An account holder can generate customized event categories by submitting a list of individual event categories. In one implementation, such individual event categories can be defined through distinct billable events on the application platform. The system can return a unique identifier that can be used to specify the customized event categorization. The usage triggers are additionally set for a subset of usage of an application platform. The trigger request can additionally specify the type of counter such as an absolute counter that tracks a total number of events, a change counter that tracks number of new events from a starting point, time counters that track absolute or changes in usage time, a percentage counter that can measure ratios or percentage changes, rate counters that updates a counter to be the current rate or frequency of a particular event, or other suitable approaches of measuring usage. The usage key can include filters or pattern parameters, or other specifications to limit the counter (and correspondingly the trigger) to a subset of types of events. For example, the subset of events counted may be phone call events originating from a phone number within a set of area codes. Preferably, the subset of usage is defined by the account associated with the usage and the usage trigger. Additionally or alternatively, a subset of usage may include usage related to a sub-account, a type of usage, a regional grouping of usage, or any suitable subset of usage of an application. A usage trigger configuration is submitted along with an account or sub-account identifier. A token or key can be used to authenticate permission to create a usage trigger for the specified account or sub-account. The usage trigger will be scoped to apply to usage of the corresponding account or sub-account. For example, usage triggers are preferably set by an account, and the usage triggers are only enforced for counters for that particular account.

The usage trigger parameters may additionally define a callback URI, an evaluation interval, and/or a trigger action.

The callback URI is preferably a resource identifier that can be messaged when the usage trigger is activated. The callback URI can be any URI. The callback URI can be a website URL of an application server operated by the account developer. For example, the callback URI can be to the same application server system used to generate application instructions for the application platform, the application server can modify subsequent instructions based on state generated in response to a usage trigger. The callback URI can alternatively be a URI of a resource of a third party. For example, a developer could setup a usage trigger to send usage-triggered events to a third party analytics server where logging and event analysis is performed.

A usage trigger parameters can additionally include security credentials, which can enable access to resources specified by a callback URI. In one variation, the resource of the callback URI (e.g., an application server operated by an account holder) may have a security layer isolating the resource from unwarranted traffic. Some security mechanisms may be communicated when receiving a trigger configuration. In one variation, an authentication token can be submitted which the application platform can store and use to sign outbound communications to the callback URI.

The security credentials are preferably stored by the application platform and used when acting in response to a usage trigger. In one implementation, the security credentials are authentication credentials that are included in transmission from the application platform to the external application. The authentication credentials can be a username/password combination, a certificate, an authentication token or key, and/or any suitable authentication mechanism. An alternative variation to interfacing with security of an external application can use identifiable resources when accessing the application. Use of the identifiable resources preferably includes transmitting communication to a callback URI from a pre-defined IP address. In such a variation, the method can further include responding with a communication address of a resource of the platform. The communication address is preferably used when transmitting a communication to the callback URI. The account can use the communication address to configure an IP white list or a black list to selectively allow traffic. Such communication address information can alternatively be pre-configured through administrator controls. In another approach, virtual private network credentials can be shared between the application platform and an external system of an account, and a VPN tunnel is used when accessing a callback URI.

An evaluation interval is preferably the rule specifying when the usage trigger should be checked. In one variation, the evaluation interval is a polling interval. The polling interval could be hourly, daily, monthly, yearly, one-time event, or any suitable time interval. In another variation, the evaluation interval may be an event-based interval. In an event-based interval, the usage trigger may be checked when a particular event or series of events are detected. The usage trigger is preferably checked in Step S140 if the evaluation interval deems a check appropriate. The trigger request can additionally or alternatively specify counter thresholds that can define when the usage trigger and/or the associated counter are evaluated or acted upon. A threshold of a usage trigger can be used in combination or in place of a polling interval.

A trigger action of a usage trigger is preferably a response taken by the application platform when the usage trigger is enforced/activated. Exemplary actions can include suspending an account, sending a notification, ending a communication session, cancelling a message, and changing permissions. The trigger action may be used in combination with a callback URI or used as an alternative for the callback URI. The trigger action preferably enables system/platform functionality that could be configured in the creation of the usage trigger. In some variations, a trigger action can function to enable a response to be made that is not exposed through an API. Some exemplary trigger actions may include suspending an account, charging stored value from an account, charging a credit card, sending a notification or alert message by email, SMS, phone, IM, or altering the behavior of an application, and/or any suitable action. As an example, a calling card application may configure a usage trigger with a trigger action that prevents a customer to continue making international calls. Any suitable number and combination of callback URIs and trigger actions may be used.

Step S120, which includes storing the trigger configuration in a usage trigger database, functions to create a repository of usage trigger configurations. The usage triggers may be stored in any suitable manner. The usage triggers are preferably retrievable based on the related counter. For example, a usage trigger for the number of messages sent from a particular account can preferably be retrieved using the account and the type of counter (e.g., number of messages sent). The application platform can be a multitenant platform. Storing the trigger configuration can include storing a plurality of trigger configurations of multiple accounts. The trigger configurations can be stored as accessible API resources. For example a REST API usage trigger resource can be updated by an account holder submitting API calls to a "/usage/triggers/" resource or a particular trigger resource within the triggers resource path. Storing of trigger configuration can additionally include updating other suitable resources. The trigger configuration is used in combination with the counters of the transaction system, and depending on exact implementation of the transaction system event processing, other databases or resources may be update to facilitate appropriately incrementing counters. For example, an account record can be updated with any counters required by usage triggers of an account. The transaction system can then use the counter list in the account record to selectively count events.

Step, S130 which includes a transaction system incrementing a counter, functions to measure the usage from an application or platform. The transaction system preferably exposes an interface used by an application platform to update counters. Events are preferably published or generated by resources of the platform and submitted to a transaction system that logs and/or counts the events. The events can be any suitable type of events such as notifications, status updates, errors, warnings, summaries of multiple events, or any suitable event notification. In a preferred implementation, the platform is a communication service platform managing communication sessions of an account.

The communication sessions are preferably telephony communication sessions controlled by telephony instructions managed by an outside account resource. In one variation, the communication service platform is used for voice calls such as PSTN, SIP, or other suitable forms of synchronous communication sessions. The synchronous sessions can alternatively be video, screen sharing or other suitable mediums of communication. In another variation, the communication services platform can additionally or alternatively be used for asynchronous telephony messaging over SMS, MMS, proprietary IP protocols, or other suitable forms of messaging. Individual events of the application platform are logged and added to the counter. In one variation, the events may only be counted if a usage trigger depends on counting such an event, which can function to sparsely account for counting events. In a multitenant platform counting all events of every account could incur considerable storage resources. The method preferably selectively counts events if a usage trigger depends on counting the event. The method can include the transaction system receiving an uncounted event, searching for associated usage triggers associated with the uncounted event, and if a usage trigger is associated with the event, counting the event in a corresponding counter. Searching for an associated usage trigger can include querying usage trigger resources of related accounts or sub-accounts. Global usage triggers can additionally be queried. The query can search for usage triggers with usage keys that match the event. If no usage triggers are identified then the event is not counted. If a usage trigger is identified then the event is counted. There can additionally be multiple counters that may be updated if for example multiple usage triggers have different usage keys that count the event. For example, an inbound mobile call can be counted in a counter for mobile calls and in a counter for inbound calls. If a counter object does not exist a new one is created. If a counter does exist the event is accounted for in the existing counter object.

Figure 5:
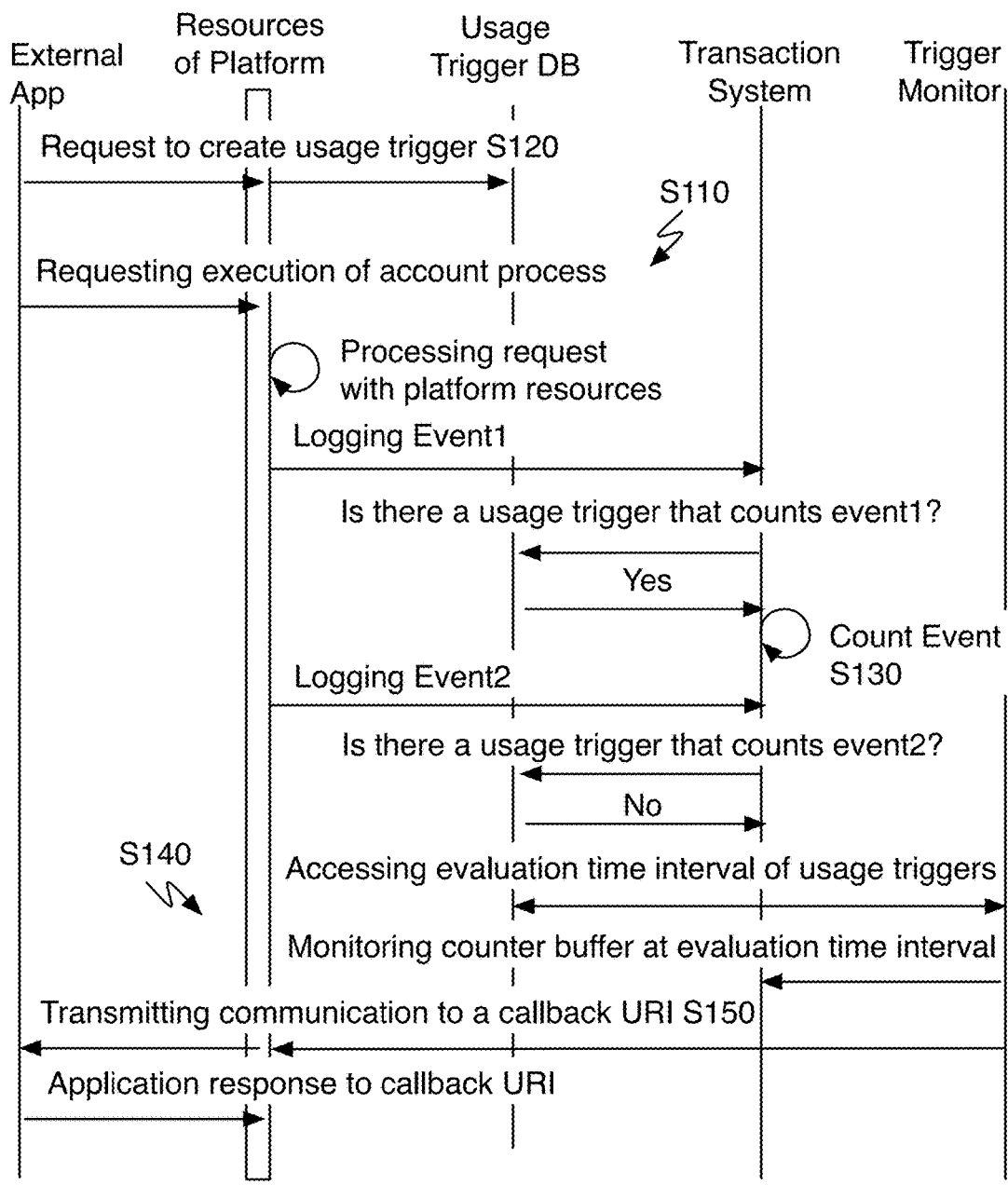
FIG. 5 is a communication flow diagram of a variation counting events corresponding to a usage trigger.

Counters are preferably any suitable data objects characterizing a metric of the application platform. Counters can be defined for any suitable type of usage. In some implementations, default counters can be defined for a plurality of types of events regardless of existence of a related usage trigger. Such counters can be for commonly counted events. Usage triggers can be added and immediately act on the current state of usage with default counters. More preferably, counters are sparsely defined according to the active usage triggers stored in the application platform. Sparsely defined describes the property of counter storage where counters are not stored for the full set of countable items for all accounts on the platform. Counters are created or updated if a usage trigger depends on counting a new event. As shown in FIG. 5, new events may result in querying for relevant usage triggers before counting the event. If a usage trigger expires or is deleted associated counters can be deleted if no other usage trigger depends on the counter. Counters are preferably stored according to an account and type of counter. Counters may alternatively be keyed or indexed in any suitable manner. Additionally, when incrementing a counter, the counter is preferably added to a buffer for monitoring. Adding a new counter to the buffer may include temporary storing, copying, adding a reference, or adding any suitable representation of the counter to the buffer.

Figure 6:
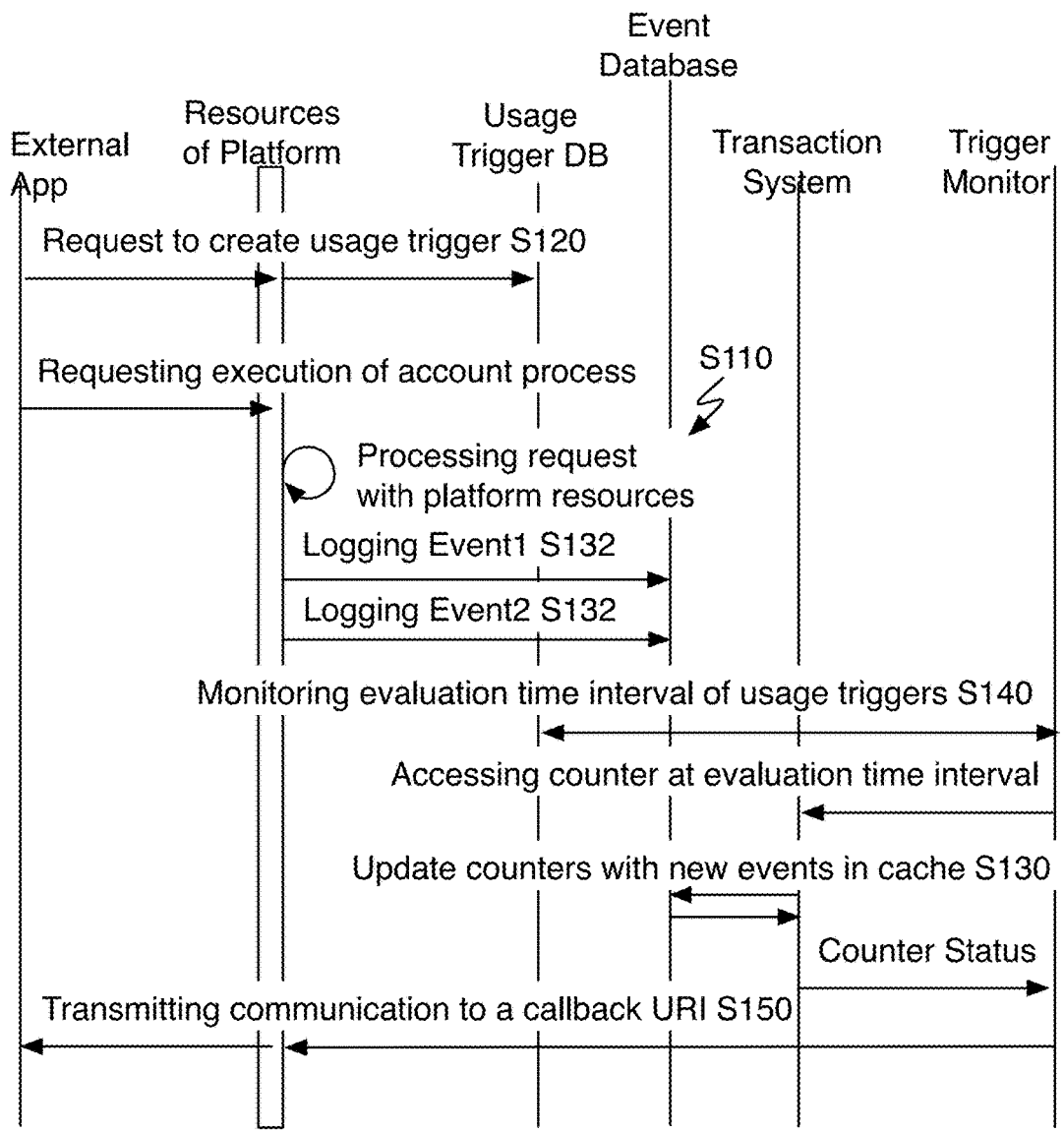
FIG. 6 is a communication flow diagram of a variation storing individual events.

As shown in FIG. 6, the method can include storing individual event records of at least one service of the application platform S132, summarizing stored event records into a group S134, and updating a counter according to events in the group. This variation functions to allow resources and services of the application platform to log events to a basic storage or event management service. The counters can be generated from this record. In an alternative approach, services and resources of the application platform (or alternatively an event logging proxy) can communicate events simultaneously to an event log and to a counter transaction system.

Figure 7:
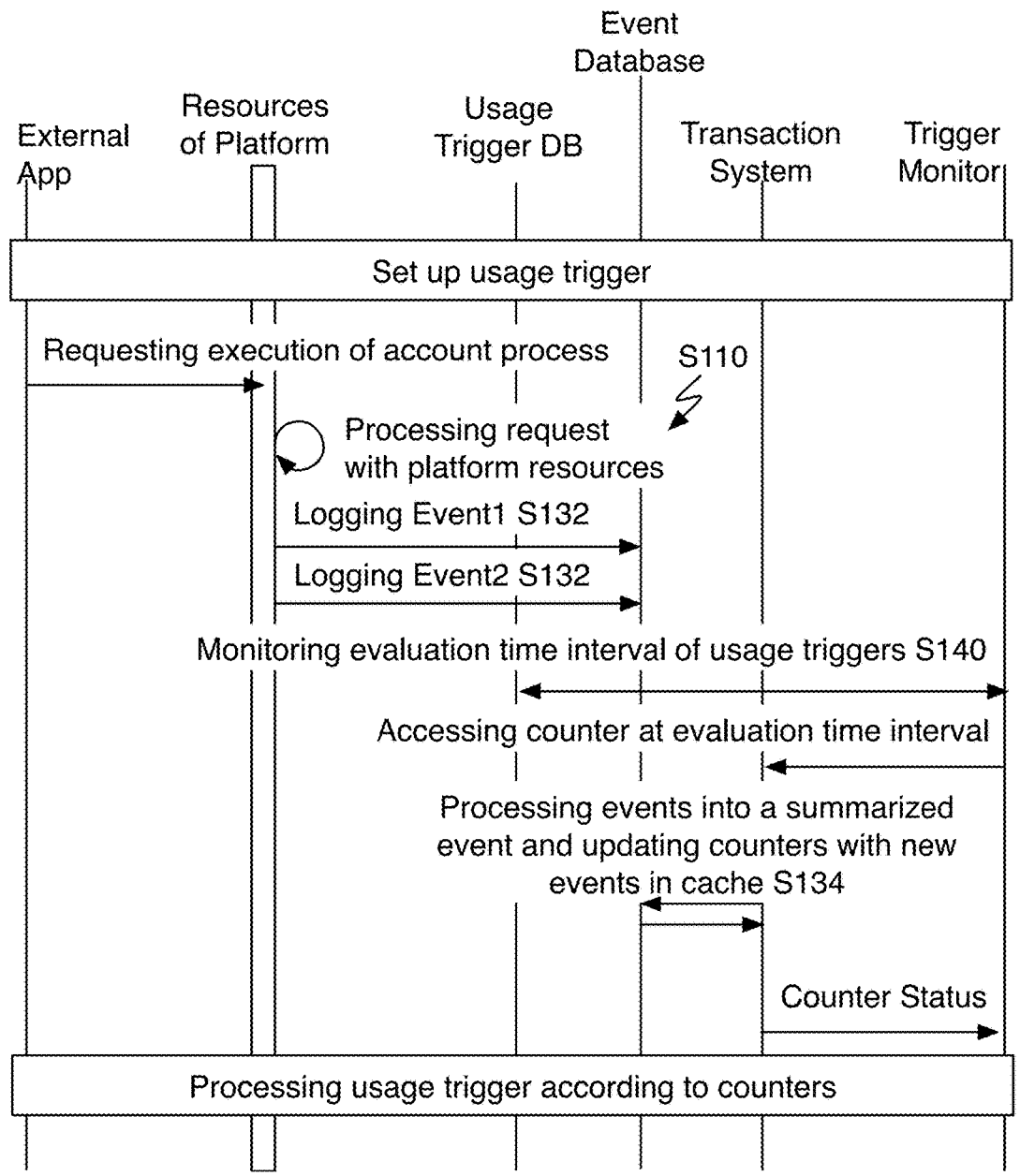
FIG. 7 is a communication flow diagram of a variation identifying events satisfying a pattern of a counter type.

Additionally, the method can include identifying events satisfying a pattern of a counter type S134, which functions to allow pattern matching, fuzzy grouping, or algorithmic identification of event types as shown in FIG. 7. A summarizer as described above or any suitable grouping engine can determine if an event should contribute to a particular group and if so which one. If a usage trigger defines a counter type that depends on pattern detection, an event pattern definition can be created and used within a summarizer system when processing events. The summarizer can consume events from a raw event log and, if the event satisfies an event pattern definition, accounts for the event in the associated counter. Multiple events can additionally be collapsed into a single summary event. In one exemplary use-case, such pattern event identification can be used in error or warning logging. Errors and warnings can have various properties and similar errors or warnings can be collapsed or collected into a single summarizing event. An event buffer can be used to indicate which events from an event log require processing.

Step S140 which includes monitoring counters in context of an associated usage trigger, functions to determine if a counter requires action by a usage trigger. A trigger monitoring system preferably monitors the status of counters updated by the transaction system. The status of counters is monitored according to usage triggers. In one variation, the trigger monitoring system preferably monitors the buffer maintained by the transaction system. The trigger monitoring system can alternatively check counters according to the evaluation time interval of a usage trigger. The monitoring system may use any suitable technique to check the status of the counters. When a counter is updated it is preferably added to a buffer. Once in the buffer, the trigger monitoring system will preferably read the counter from the buffer. It can then verify if the account associated with that particular counter has a usage trigger for that type of counter. If there is an associated usage trigger, the trigger monitoring system may additionally check if the evaluation interval of the usage trigger is satisfied. When a usage trigger is identified for the counter and any additional conditions such as the evaluation interval are satisfied, the usage trigger is processed and acted upon in Step S150. The counter is preferably removed from the buffer once the counter is analyzed. In a related approach, the usage trigger may be processed according to the timing of the evaluation interval. At a time defined by the evaluation time interval, the counter or counters referenced by a usage trigger can be checked. In one variation, if any new counter activity occurred since the last check, the usage trigger is processed (e.g., communicating with a callback URI). The counters are checked for a threshold or an alternative metric condition. The related counters can additionally be updated in response to evaluating a usage trigger. When it is time to process the usage trigger, a trigger monitoring system can update associated counters. In one variation, a counter buffer is used to record which events have not been accounted for in the current counters, and in particular, which events that contribute to the counter associated with the currently processed usage trigger. The evaluation interval prompts the counters to be updated. Events referenced in the counter buffer are measured and accounted for in the counters associated with the usage trigger. Such a variation can be used with usage triggers for errors and warnings. A similar variation can prioritize the update of counters with usage triggers with upcoming intervals.

Step S150 which includes processing usage trigger upon a counter satisfying a condition of the usage trigger, functions to perform the response specified by the usage trigger. In a first variation, the usage trigger is satisfied when the evaluation interval has expired and the measurement of the counter satisfies a condition. The condition is preferably defined by a threshold limit defined in the usage trigger configuration. The threshold can be a maximum threshold where the usage trigger is processed when the measurement of the counter exceeds the threshold. The threshold can be a minimum threshold where the usage trigger is processed when the measurement of the counter is less than the threshold. The condition can alternatively be a range, a function of other properties including at least one measurement of a counter object. Processing a usage trigger preferably invokes the action configured for the usage trigger. The condition can alternatively be a change in the count since a previous processing of the usage trigger such that any changes in a count are acted on at a timing interval specified by the evaluation time interval of the usage trigger.

In one variation, the usage trigger configuration includes a callback URI parameter. Processing the usage trigger can include sending a request (e.g., HTTP request) to the callback URI, which functions to alert, message, or notify a resource of the counter status as shown in FIGS. 5 and 6. The URI is preferably for an internet accessible resource that can perform any suitable action after receiving the request. The URI is preferably an external resource operated by the account associated with the usage trigger. For example, a first application created by a first account can create a usage trigger. When a counter of the usage trigger satisfies a condition, the external transmits a message to a resource specified by the callback URI. The callback URI request may additionally include data parameters characterizing properties of the counter and/or usage trigger. The data parameters can include the current value of the counter, previous value of the counter, time stamps of updates to the counter, reference identifiers of events accounted for in the count, or any suitable information concerning the counter. The application server can then perform any suitable action. Exemplary external application actions of an application server could include updating a database based on the event, altering state of a session controlled by the application server, sending an alert to a developer, or any suitable response. In one implementation, an application server can respond by sending a response to the callback URI call. The response can include application platform instructions. The application platform instructions can act similarly to the trigger actions described below in that they alter state of the application platform. In one variation, a callback URI could be to a third party application server, such as an analytics service operated by a service distinct from the account holder and the application platform operator.

Figure 8A:
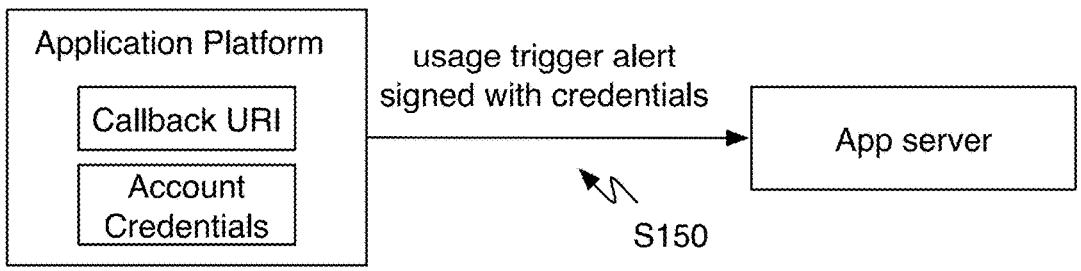
FIGS. 8A-8C are schematic representations of sending a request to the callback URI according to security procedures.

When sending a request to the callback URI, the method can additionally include sending the request according to security procedures. The resource referenced by the callback URI can be secured against unwarranted access by the operator of the callback resources (e.g., the outside system of the account holder). An open URI or a private URI can be contacted by any outside entity, which may be sufficient for some situations. A secured callback URI can include mechanism to limit access of the callback URI. In one variation, security credentials of the usage trigger are used to access the callback URI as shown in FIG. 8A. The external application can use the security credentials to authenticate or authorize access to the callback URI. The callback communication is preferably cryptographically signed with the security credentials of the account holder. If the security credentials are not validated by the application then the communication directed to the callback URI can be denied, otherwise the communication can be accepted and processed by the callback resources. Such communication signing can be used in addition to any of the below alternatives.

Figure 8B:
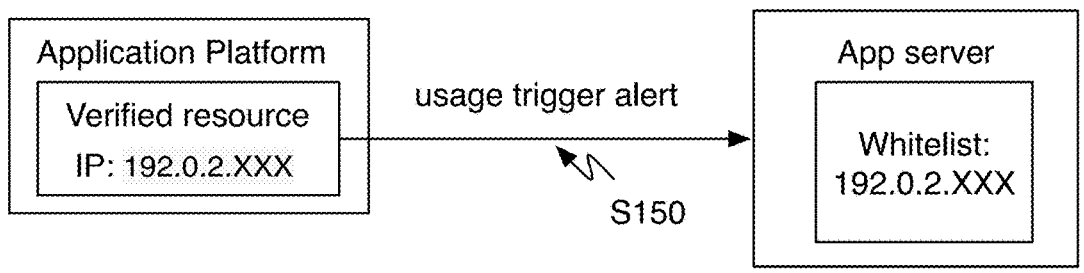
Figure 8C:
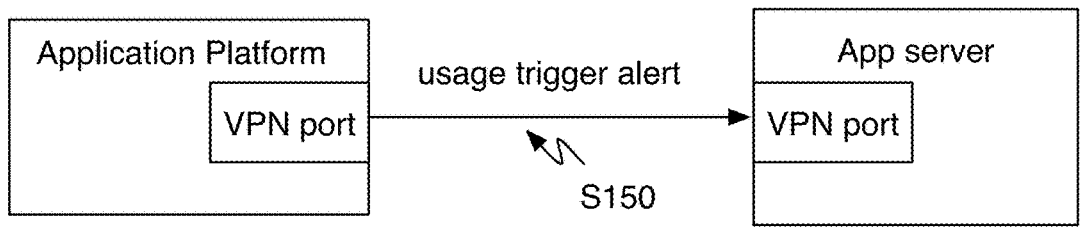
Figure 9:
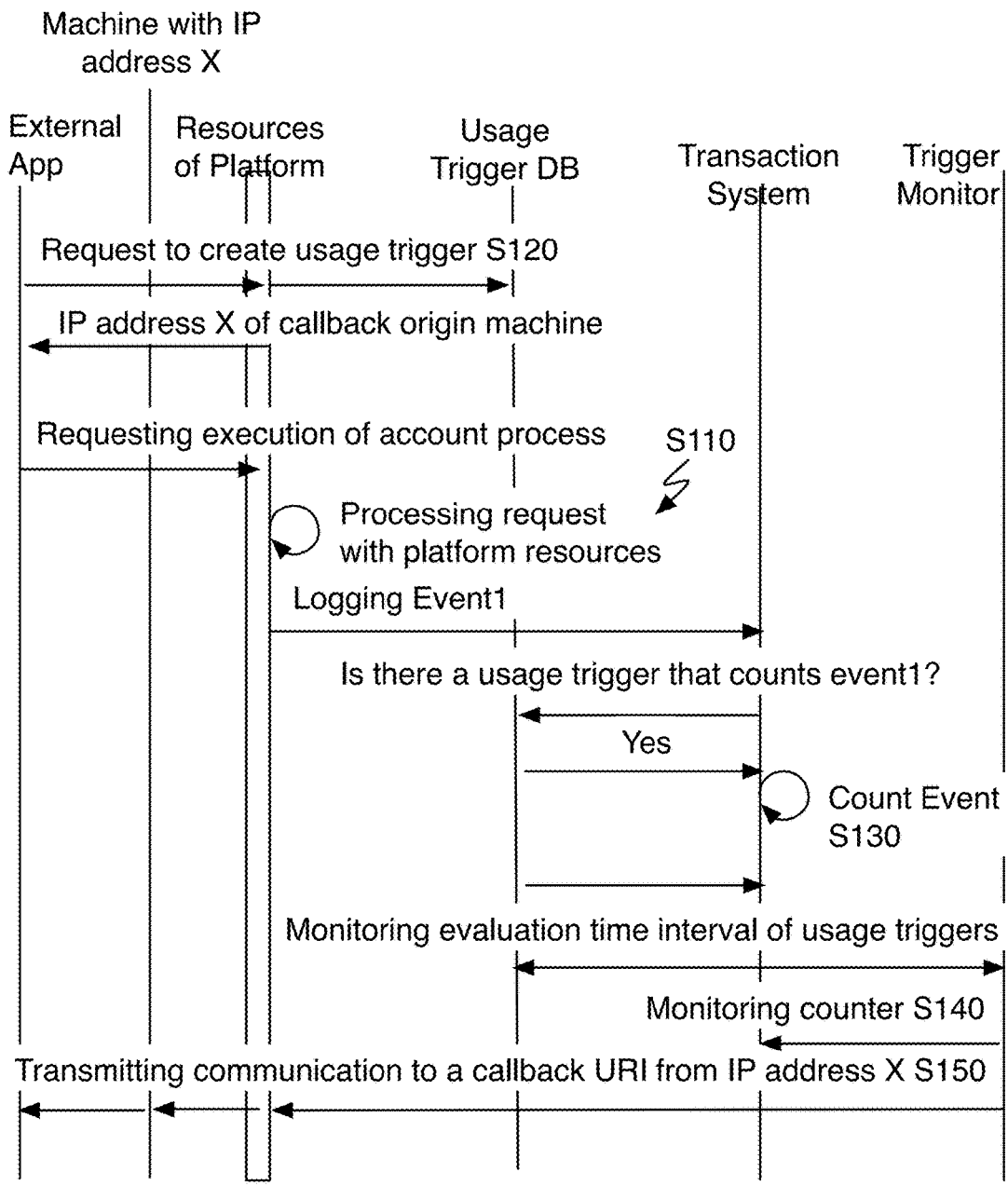
FIG. 9 is a communication flow diagram of a variation supplying verified resource information.

In an alternative variation, the security procedures can include sending the request from a verified resource of the application server. The verified resource of the application server can include machine with a static IP address, a machine with VPN pipe/tunnel to an external resource of the account holder, or any suitable private communication channel between the application platform and the external application. The verified resource can have a fixed IP address that can be pre-arranged as a trusted communication source. As mentioned above, the verified resource can be communicated in response to an account creating a usage trigger as shown in FIG. 9. The external application can whitelist or blacklist IP addresses such that the verified resource is permitted to contact the callback URI as shown in FIG. 8B. Sending the request according to security procedures can include establishing a VPN pipe and sending the request across the VPN pipe as shown in FIG. 8C.

Figure 10:
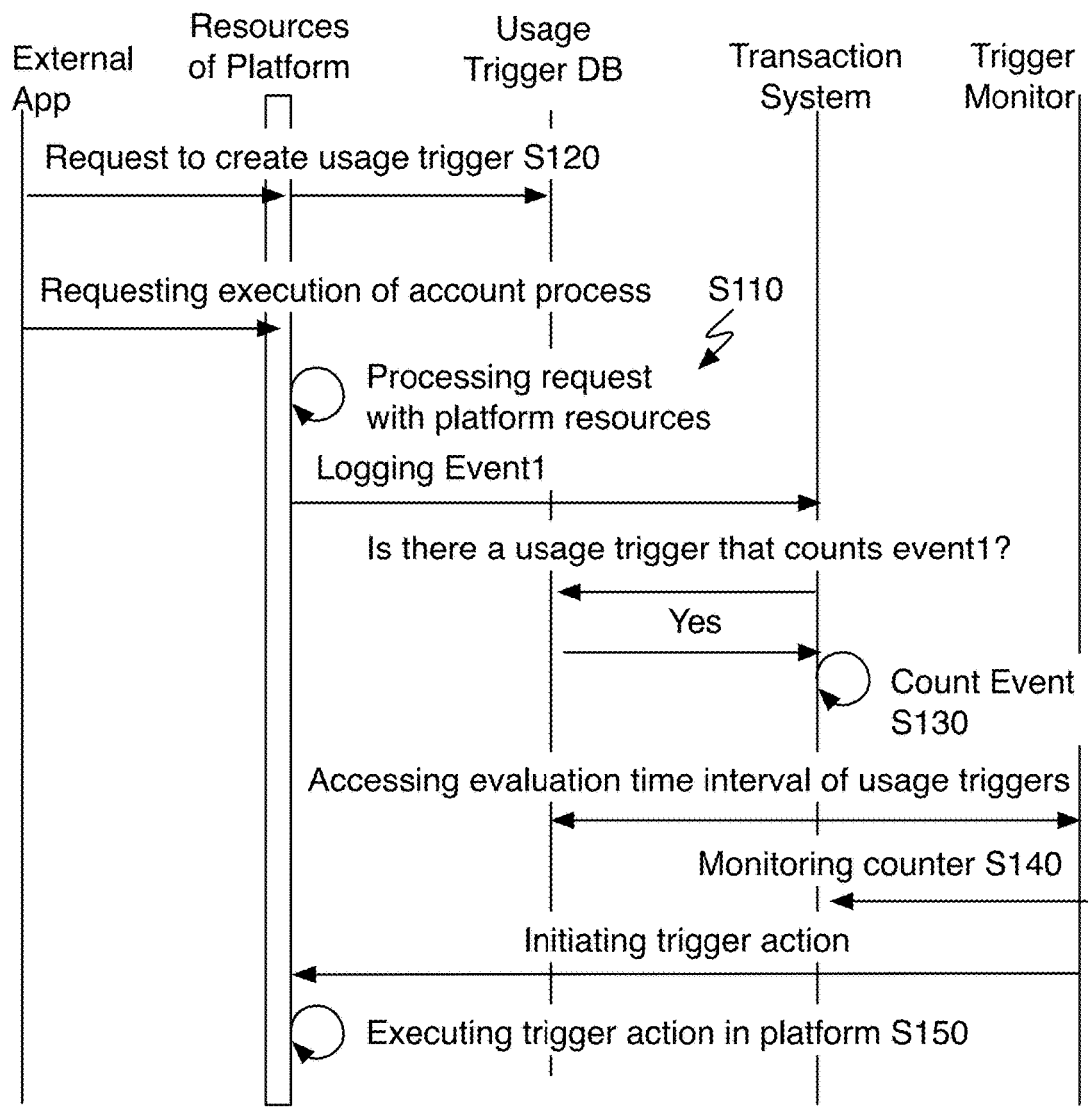
FIG. 10 is a communication flow diagram of a variation executing a trigger action on the platform.

As an additional or alternative variation, the usage trigger configuration may include a trigger action. Processing the usage trigger can include performing an action specified by the associated usage trigger as shown in FIG. 10. This variation preferably enables real-time response within an application platform. In some situations the actions that may be performed may not be exposed to outside entities through an API, thus the action enables responses that in some situations wouldn't be available to outside entities. For example, if there is a call being performed over a telephony application platform, and the call uses up all pre-paid minutes during the call, the usage trigger may have a trigger action to end the call. Thus the usage trigger enables an outside entity to build event based functionality without having to maintain an application to cancel the in-progress call or even be reliant on that functionality being exposed through an API. Executing a trigger action may additionally or alternatively include suspending an account, charging stored value account, charging a credit card, sending a notification or alert message by email, SMS, phone, IM, or altering the behavior of an application, and/or any suitable action.

Additionally, processing the usage trigger can include resetting or removing the usage trigger. In some instances, a usage trigger can be configured as a single use usage trigger. After the usage trigger is processed, the usage trigger resource can be removed or suitably managed to end use of the usage trigger. A counter associated with the usage trigger can similarly be deleted or closed. In some instances, a usage trigger can be configured to reset. Preferably, resetting a usage trigger includes creating a new counter or clearing the counter. Resetting a usage trigger can be used to enable actions that are triggered after a specified number of occurrences.

An alternative embodiment preferably implements the above methods in a computer-readable medium storing computer-readable instructions. The instructions are preferably executed by computer-executable components preferably integrated with a usage trigger system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
a triggering system receiving first trigger configuration from an external application server of a first platform account of an application platform system via the Internet;
the triggering system generating a first usage trigger in accordance with the first trigger configuration;
a service of the application platform system generating a first event that is associated with the first platform account and the first usage trigger;
responsive to generation of the first event, the triggering system incrementing a counter that is associated with the first usage trigger; and
responsive to a determination by the triggering system that the counter satisfies a trigger condition of the first usage trigger, the triggering system processing the first usage trigger, wherein processing the first trigger comprises at least one of transmitting a request and initiating execution of a trigger action at the application platform system.

2. The method of claim 1, wherein the application platform system includes the triggering system.

3. The method of claim 1, wherein the first trigger configuration specifies the trigger condition.

4. The method of claim 1, wherein the first trigger configuration specifies a callback uniform resource identifier (URI) of an external system, and wherein processing the first trigger comprises transmitting the request to the callback URI.

5. The method of claim 1, wherein the first trigger configuration defines the trigger action, and wherein processing the first trigger comprises initiating execution of the trigger action at the application platform system.

6. The method of claim 5, wherein the trigger action is an action performed by the platform system, and the trigger action enables a response to be made that is not exposed through an application programming interface (API) of the application platform system.

7. The method of claim 1, wherein the service of the application platform system generates the first event during operation of the platform system on behalf of the first platform account.

8. The method of claim 1, wherein the triggering system incrementing a counter comprises: the triggering system incrementing the counter by a cost of the first event.

9. The method of claim 1, wherein the triggering system incrementing a counter comprises: the triggering system incrementing the counter by a resource usage of the first event.

10. An application platform system comprising:
a triggering system; and
at least one service,
wherein the triggering system is constructed to receive first trigger configuration from an external application server of a first platform account of an application platform system via the Internet,
wherein the triggering system is constructed to generate a first usage trigger in accordance with the first trigger configuration,
wherein the at least one service is constructed to generate a first event that is associated with the first platform account and the first usage trigger,
wherein responsive to generation of the first event, the triggering system is constructed to increment a counter that is associated with the first usage trigger, and
wherein responsive to a determination by the triggering system that the counter satisfies a trigger condition of the first usage trigger, the triggering system is constructed to process the first usage trigger, wherein processing the first trigger comprises at least one of transmitting a request and initiating execution of a trigger action at the application platform system.

11. The system of claim 10, wherein the first trigger configuration specifies the trigger condition.

12. The system of claim 10, wherein the first trigger configuration specifies a callback uniform resource identifier (URI) of an external system, and wherein processing the first trigger comprises transmitting the request to the callback URI.

13. The system of claim 10, wherein the first trigger configuration defines the trigger action, and wherein processing the first trigger comprises initiating execution of the trigger action at the application platform system.

14. The system of claim 13, wherein the trigger action is an action performed by the application platform system, and the trigger action enables a response to be made that is not exposed through an application programming interface (API) of the application platform system.

15. The system of claim 10, wherein the service of the application platform system is constructed to generate the first event during operation of the application platform system on behalf of the first platform account.

16. The system of claim 10, wherein the triggering system incrementing a counter comprises: the triggering system incrementing the counter by a cost of the first event.

17. The system of claim 10, wherein the triggering system incrementing a counter comprises: the triggering system incrementing the counter by a resource usage of the first event.

* * * * *